(12) United States Patent
Khalil et al.

(10) Patent No.: US 9,960,992 B2
(45) Date of Patent: May 1, 2018

(54) SYSTEMS AND METHODS FOR ROUTING DATA IN A NETWORK

(75) Inventors: Ahmad Najib Khalil, Red Bank, NJ (US); Anthony W. Beaseu, North Middletown, NJ (US); Dariusz Sliwinski, Bayville, NJ (US); Michael Gemelos, Brooklyn, NY (US); Vincent Gheraldi, Howell, NJ (US)

(73) Assignee: ITXC IP Holdings S.a.r.l., Luxembourg (LU)

( * ) Notice: Subject to any disclaimer, the term of this patent is extended or adjusted under 35 U.S.C. 154(b) by 261 days.

(21) Appl. No.: 13/223,939

(22) Filed: Sep. 1, 2011

(65) Prior Publication Data
US 2013/0058349 A1    Mar. 7, 2013

(51) Int. Cl.
*H04L 12/705* (2013.01)
*H04L 12/721* (2013.01)
*H04L 12/703* (2013.01)
*H04L 12/753* (2013.01)

(52) U.S. Cl.
CPC .............. *H04L 45/18* (2013.01); *H04L 45/12* (2013.01); *H04L 45/28* (2013.01); *H04L 45/48* (2013.01)

(58) Field of Classification Search
None
See application file for complete search history.

(56) References Cited

U.S. PATENT DOCUMENTS

| | | | | |
|---|---|---|---|---|
| 7,031,253 B1* | 4/2006 | Katukam | ............ | H04L 41/0806 370/222 |
| 2008/0310417 A1* | 12/2008 | Friskney | ............. | H04L 12/4645 370/392 |
| 2010/0020797 A1* | 1/2010 | Casey | .................. | H04L 12/462 370/390 |
| 2011/0170406 A1* | 7/2011 | Krishnaswamy | ... | H04L 41/0677 370/222 |
| 2012/0320926 A1* | 12/2012 | Kamath | .................. | H04L 45/66 370/401 |
| 2013/0011132 A1* | 1/2013 | Blair | ..................... | H04L 49/351 398/2 |

* cited by examiner

*Primary Examiner* — Chirag Shah
*Assistant Examiner* — Srinivasa Reddivalam
(74) *Attorney, Agent, or Firm* — Kaplan Breyer Schwarz, LLP (57) ABSTRACT

A method for routing data in a network including a plurality of nodes connected by links, the method includes collapsing first and second rings of the nodes together, for each of the nodes in the network, determining a shortest path tree to each of the other nodes in the network, and for data sourced from a particular one of the nodes in the network, blocking the link or links not included in the shortest path tree determined for the particular one of the nodes. Also, a system for routing data through a network having a plurality of nodes connected by links, includes a ring collapsing module for collapsing first and second rings of the nodes together, a shortest path tree calculation module for determining, for each of the nodes, a shortest path tree to each of the other nodes in the network, and a link blocking module for blocking the link or links not included in the shortest path tree determined for data sourced from a particular one of the nodes.

18 Claims, 4 Drawing Sheets

SYSTEMS AND METHODS FOR ROUTING DATA IN A NETWORK

FIELD

The present disclosure relates to data networks. More particularly, the present disclosure relates to systems and methods for routing data in a network using source-based shortest path trees and Access-Control Lists.

BACKGROUND

It is challenging to create a loop-free Ethernet network for unicast and multicast traffic that guarantees shortest paths, especially in a large network of plural nodes with a mesh topology. Because data transmission is based on broadcasting traffic among all the nodes until MAC learning is achieved and data transmitted between the nodes in the network take the shortest paths, the data can loop indefinitely around the nodes and cause throughput and performance degradation.

In order to prevent data from indefinitely looping around the nodes of the network, some links connecting the nodes will be blocked to prevent the transmission of data indefinitely between any two nodes.

Although the blocked links in the network prevent data from looping around the network, data traveling between nodes connected by blocked links must always take a longer path in the network.

Accordingly, a system and method for loop-free forwarding of data in a network with the shortest data paths and/or with fast failure recovery, is needed.

SUMMARY

Disclosed herein is a method for routing data in a network including a plurality of nodes connected by links. The method in one or more embodiments comprises for each of the nodes in the network, determining with a processor a shortest path tree to each of the other nodes in the network, and for data sourced from a particular one of the nodes in the network, blocking the link or links not included in the shortest path tree determined for the particular one of the nodes with a processor.

In one or more embodiments of the method, the shortest path tree determining process is performed off-line.

In one or more embodiments of the method, the blocking process is performed by an Access-Control List process.

In one or more embodiments of the method, the Access-Control List process is performed at each of the link or links not included in the shortest path tree determined for the data sourced from the particular one of the nodes.

In one or more embodiments of the method, at least one of the nodes the network comprises a subnetwork formed by at least two nodes and wherein the shortest path tree determining process determines a shortest path tree between the subnetwork and each of the other nodes in the network.

In one or more embodiments of the method, the nodes of the network are arranged in first and second rings.

In one or more embodiments of the method, the method further comprises collapsing the first and second rings of the nodes together prior to the shortest path tree determination process.

In one or more embodiments of the method, certain ones of the nodes in the first and second rings form at least one subnetwork.

In one or more embodiments of the method, each of the nodes in the at least one subnetwork is connected to another of the nodes in the at least one subnetwork by two of the links.

In one or more embodiments of the method, if one of the two links in a determined one of the shortest path trees fails, further comprising transmitting data on other one of the two links in accordance with the determined one of the shortest path trees.

In one or more embodiments of the method, if one of the nodes of the at least one subnetwork fails, and the failed node is in a determined one of the shortest path trees, the method further comprises re-routing data within the at least one subnetwork with a processor to avoid the failed node and transmitting data in accordance with the determined one of the shortest path trees.

In one or more embodiments of the method, the shortest path tree determining process is performed with a Dijkstra algorithm, a breadth-first search algorithm, a Bellman-Ford algorithm, or some other algorithm.

Further disclosed herein is a system for routing data through a network comprising a plurality of nodes connected by links. In one or more embodiments, the system comprises a shortest path tree calculation module for determining, for each of the nodes, a shortest path tree to each of the other nodes in the network and a link blocking module for blocking the link or links not included in the shortest path tree determined for data sourced from a particular one of the nodes.

In one or more embodiments of the system, at least one of the nodes the network comprises a subnetwork and wherein the shortest path tree determining process determines a shortest path tree between the subnetwork and each of the other nodes in the network.

In one or more embodiments of the system, the nodes of the network are arranged in first and second rings.

In one or more embodiments of the system, the system further comprises a ring collapsing module for collapsing the first and second rings of the nodes together prior to determining the shortest path tree with the shortest path tree module.

In one or more embodiments of the system, the first and second rings are connected by certain ones of the links.

In one or more embodiments of the system, certain ones of the nodes in the first and second rings form at least one subnetwork.

In one or more embodiments of the system, each of the nodes in the at least one subnetwork is connected to another of the nodes in the at least one subnetwork by two of the links.

In one or more embodiments of the system, the link blocking module implements an Access-Control List at ports of the link or links not included in the shortest path tree.

In one or more embodiments of the system, at least one of the nodes of the network comprises a subnetwork and wherein the shortest path tree calculation module determines a shortest path tree between the subnetwork and each of the other nodes in the network.

Also disclosed herein is a method for routing data through a network, wherein the network comprises a plurality of subnetworks, and wherein the data being routed is transmitted from a transmitting node on a first subnetwork to a receiving node on a second subnetwork. The method comprises, in one or more embodiments, routing data across links among the subnetworks in which one or more links connecting the subnetworks are selectively blocked based upon an identifier associated with the first subnetwork from which the data is being routed and after the data reaches the second subnetwork, routing the data within the second subnetwork to the second node in which one or more links are blocked entirely, without regard to the subnetwork from which it originates.

DETAILED DESCRIPTION

Figure 1:
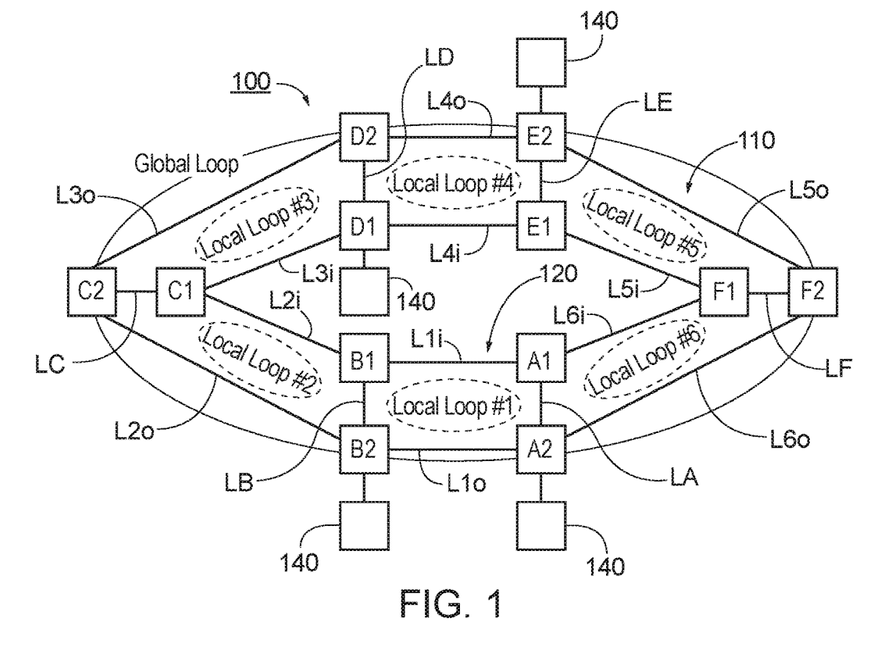
FIG. 1 diagrammatically depicts an exemplary network according to one or more embodiments of the present disclosure.

One aspect of the present disclosure is a method for routing data in a network. FIG. 1 depicts an exemplary network according to one or more embodiments of the present disclosure, denoted generally by reference numeral 100. The network 100 comprises an outer ring 110 including a first plurality of nodes A2, B2, C2, D2, E2, and F2 connected by links L1o, L2o, L3o, L4o, L5o, and L6o, and an inner ring 120 including a second plurality of nodes A1, B1, C1, D1, E1, and F1 connected by links L1i, L2i, L3i, L4i, L5i, and L6i. Nodes A1 and A2 are connected by link LA, nodes B1 and B2 are connected by link LB, nodes C1 and C2 are connected by link LC, nodes D1 and D2 are connected by link LD, nodes E1 and E2 are connected by link LE, and nodes F1 and F2 are connected by link LF. These nodes and links form the core network of the network 100.

Referring still to FIG. 1, the outer and inner rings 110, 120 form a network topology that represents a global loop. In one or more embodiments, certain ones of the nodes in the outer and inner rings 110, 120 can be linked together to form one or more local loops 1-6. For example, but not limitation, nodes A1, A2, B1, and B2 form local loop 1, nodes B1, B2, C1, and C2 form local loop 2, nodes C1, C2, D1, and D2 form local loop 3, nodes D1, D2, E1, and E2 form local loop 4, nodes E1, E2, F1, and F2 form local loop 5, and nodes F1, F2, A1, and A2 form local loop 6. One or more of the nodes in the local loops 1-6 can be used for inter-connecting regional/aggregation networks 140 to the network 100. The regional/aggregation networks 140 are not part of the core network of the network 100.

One of ordinary skill in the art will recognize that the network can have a structure other than a dual-ring. Thus, in one or more other embodiments, the network can have a single ring structure, a mesh structure, a fully connected structure, or any other suitable structure. In addition, the network can have a greater or lesser number of nodes and local loops than what is shown in FIG. 1, and the local loops can have a greater or lesser number of nodes than what is shown in FIG. 1.

The network 100 in one or more embodiments, can include data paths implemented with network elements that support provider backbone bridges (IEEE 802.1 ah). Further, Ethernet Ring Protection (G.8032) can be used in the local loops 1-6 to provide protection mechanisms at the Ethernet layer and Link Aggregation Control Protocol (IEEE 802.3ad) can be used for implementing the links LA, LB, LC, LD, LE, and LF between respective nodes A1 and A2, nodes B1 and B2, nodes C1 and C2, nodes D1 and D2, nodes E1 and E2, and nodes F1 and F2, which interconnect the outer and inner rings 110, 120. Still further, source-based Access Control-Lists (ACL) can be used in the global loop to provide control data forwarding. In one or more alternate embodiments of the network, regional Multiple Spanning Tree Protocol (MSTP) can be used in place of Ethernet Ring Protection (ERP) if ERP is not supported on the network element.

The use of the ERP topology in the local loops 1-6 of the network 100 provides fast failure protection and controls data forwarding across the outer and inner local loop segments in manner that prevents data from indefinitely looping around in the local loops 1-6. With the ERP topology, the links connecting each node of the local loop (Ethernet Ring) to an adjacent node participating in the same Ethernet ring, comprises two independent physical links. This simple topology provides predictable network performance and ensures that blocking will be between one of the routes in the local ring (e.g., the inner ring segment or the outer ring segment), which allows deterministic as well as optimal routing. In addition, traffic engineering and load balancing can also be achieved per local loop or ring when using multiple ERP instances to control trunk identifiers to the same destination (B-VIDs) or a range of B-VIDs, which will provide optimal routing. As is well known in the art, a B-VID is backbone VLAN (Virtual Local Area Network) identifier that distinguishes different trunks in the network.

In accordance with another aspect of the present disclosure, a static source-based shortest path tree process is used in the global loop of the network 100 to provide a loop-free forwarding plane with the shortest paths for unicast and multicast data/traffic. In addition, because provider backbone bridges are used for implementing the global network which represents the global loop, ACL can be used in the global loop to control traffic based on B-MAC (backbone media access control) source addresses of the forwarded packets. A B-MAC is a backbone MAC address for a node of the network. Each node in the network has its own B-MAC address. Data sourced at a node in the network is identified by the node's source B-MAC address. With provider backbone bridges, the B-MACs for all network elements are known by service providers, which allows service providers to configure the ACLs to control traffic based on the B-MACs.

Figure 3A:
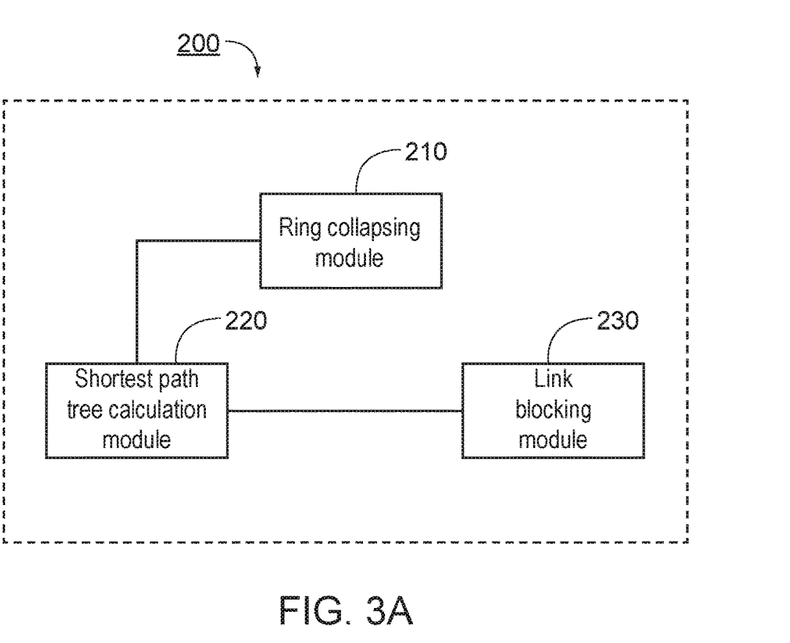
FIG. 3A is a block diagram of an exemplary system for performing a method for routing data according to one or more embodiments of the present disclosure.

FIG. 3A is a block diagram of an exemplary system 200 for performing a method for routing data using source-based shortest path trees and ACLs, according to one or more embodiments of the present disclosure. The system 200 comprises ring collapsing module 210, a shortest path tree calculation module 220, and a link blocking module 230. The ring collapsing module 210, the shortest path tree calculation module 220, and the link blocking module 230 can be implemented in hardware, software, or a combination of hardware and software. For example, but not limitation, the ring collapsing module 210, the shortest path tree calculation module 220, and the link blocking module 230 are software modules configured to perform the data routing method described herein. The modules 210, 220, 230 can reside in one or more servers or like computing devices or machines coupled to or over the network 100. The structure and function of such servers are well known to those skilled in the art.

Figure 3B:
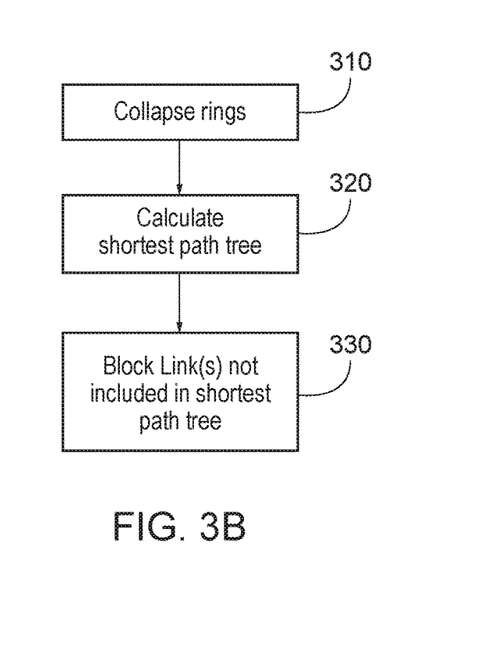
FIG. 3B is flow chart of a method for routing data using the system of FIG. 3A, according to one or more embodiments of the present disclosure.

FIG. 3B is flow chart of a method for routing data, which can be performed by the system 200 of FIG. 3A, according to one or more embodiments of the present disclosure. Although the method will be described with reference to the network shown in FIG. 1, it can be used for routing data in other networks with different structures, numbers of nodes, and numbers of local loops. In step 310, the ring collapsing module 210 collapses the outer and inner rings 110 and 120 of the network 100 together as shown in FIG. 3 to define collapse ring 130 having nodes A, B, C, D, E, and F connected by links L1, L2, L3, L4, L5, and L6. In step 320, for each of the nodes A, B, C, D, E, and F, the shortest path tree calculation module 220 calculates a source-based shortest path tree (e.g., AT, CT, and FT) to each of the other nodes in the network. The shortest path trees can be calculated or determined offline, for each of the nodes A-F in the network. In step 330, for data sourced from a particular one of the nodes A-F in the network, the link blocking module 230 blocks the link or links (L1-L6) not included in the source-based shortest path tree for that particular node. The link blocking module 230 can use ACLs appropriately configured at the link or links to implement link blocking.

Figure 2:
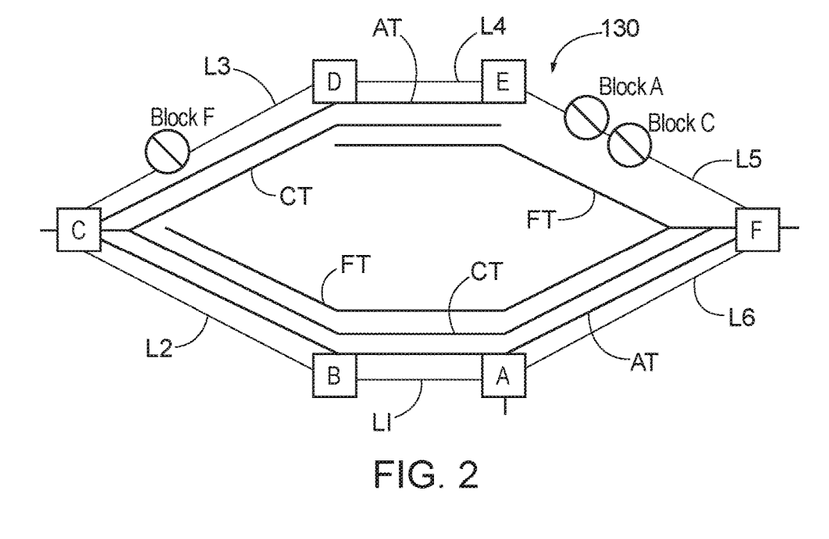
FIG. 2 diagrammatically depicts the network of FIG. 1 with its outer an inner rings collapsed together so that source-based shortest path trees can be easily calculated.

FIG. 2 depicts the calculated source-based shortest path trees in collapsed network ring 130. In the example shown in FIG. 2, the C node-based shortest path tree CT does not include link L5 connecting nodes E and F. Accordingly, an ACL configured at the ingress/egress ports of link L5 connecting nodes E and F will have an entry to block or deny traffic with a source B-MAC "C," or with a source B-MAC with a first group of hexadecimal digits that represent the regional network of "C." Similarly, the A node-based shortest path tree AT does not include the link L5 connecting nodes E and F, therefore, an ACL configured at the ingress/egress ports of link L5 connecting nodes E and F will have an entry to block or deny traffic with a source B-MAC "A," or with a source B-MAC with a first group of hexadecimal digits that represent the regional network of "A." The F node-based shortest path tree FT does not include the link L3 connecting nodes C and D. Accordingly, an ACL configured at the ingress/egress ports connecting nodes C and D will have an entry to block or deny traffic with a source B-MAC "F," or with a source B-MAC with a first group of hexadecimal digits that represent the region of "F." Although not shown in FIG. 2, the shortest path trees are also determined for the B, D, and E nodes.

The outer and inner ring collapsing module 210 simplifies the configuration of the ACLs and allows a safe approximation of the source-base shortest path trees because the original assumption is that in a global network, the diverse protection routes run parallel to the primary routes, which means, if the shortest path between A1 and C1 is via B1, the shortest path between A2 and C2 will be via B2.

In one or more embodiments, the source-based shortest path trees calculated or determined by the shortest path tree module 220 can be calculated with Dijkstra algorithm. The Dijkstra algorithm is a heuristic approach that allows the calculation of the single-source shortest paths between the source node and each other nodes in the networks. This set of single-source shortest paths can then be combined/aggregated to form the source-based shortest path trees. For example, but not limitation, if two shortest paths use the same intermediate link, then this link would be counted once in the shortest path tree.

The single-source shortest paths can be calculated in one or more other embodiments with a breadth-first search algorithm (BFS) which is a graph search algorithm that begins at the root (source) node and explores all the neighboring nodes. Then for each of the nearest nodes, it explores their unexplored neighboring nodes, and so on, until it finds the shortest path from the root or source node to each other nodes.

Another known algorithm that can be used in one or more further embodiments to determine the single-source shortest paths is the Bellman-Ford algorithm. The Bellman-Ford algorithm computes single-source shortest paths in a weighted graph where an edge weight can be negative or positive. For graphs with only non-negative edge weights, the Dijkstra algorithm will take less time to solve the problem. Thus, Bellman-Ford algorithm can be used primarily for graphs with negative edge weights.

It is possible to calculate multiple equal cost paths, even when a single algorithm is used to find the shortest paths, which form the source-based shortest path trees. When this occurs, a tie breaker scheme should be applied to select the shortest path. For example, but not limitation, when the Dijkstra algorithm calculates two equal cost paths, the algorithm can be configured to select the path that includes the lowest node ID values, or even to pick randomly among the equal cost paths. In the exemplary network shown in FIG. 2, the path between nodes A and C in the A(source)-based shortest path tree and the C-based shortest path tree should be symmetric or congruent. This rule requires a careful implementation of the source-based shortest path tree algorithm. In one or more embodiments, the symmetric paths can be implemented offline after all equal paths have been calculated. In one or more other embodiments, the symmetric paths can be implemented using other suitable methods.

The earlier described ACLs can be used by the link blocking module 230 for controlling traffic per source-based shortest path tree. The ACLs block the links L1-L6 not included in the source-based shortest path tree calculated for a particular one of the nodes A-F. For every shortest path tree of a node, ACLs are created to drop or deny the data/traffic at the links not included in the shortest path tree, which data/traffic is identified with the source B-MAC address of the source node. As stated earlier, the ACLs can be implemented at the ingress and/or egress ports of all the links that do not belong to the shortest path tree of a corresponding node. The forwarding or data paths can be represented by multiple layers of source-based shortest path trees, where each node sends data/traffic (unicast and multicast) on its own tree. Path congruency should be respected when calculating the shortest path trees for all the nodes. This will ensure bi-directional traffic on the same path. In this case, any two nodes x and y will have the same path between each other using x-based shortest path tree as well as y-based shortest path tree. This will substantially ensure the shortest paths among all nodes, especially in a global multipoint scenario.

The B-MAC addresses can use certain formatting to simplify the ACL configurations. For example, in one or more embodiments, all the B-MAC addresses for nodes in an aggregation/regional network (e.g., aggregation/regional network 140 connected to node A2 in FIG. 1), such as India, can share a first group of hexadecimal digits A000. ACLs can be configured to control traffic based on source B-MAC A000.xxxx.xxxx, which means all traffic coming from and going to the India aggregation/regional network will be routed in the network using the existing ACLs that control source B-MAC A000.xxxx.xxxx. This method can be used to control traffic sourced from the aggregation/regional networks without changing the configuration in the provider backbone bridges of the network. Thus, there is no need for core backbone configuration changes (i.e., ACL changes) when the provider backbone bridges are augmented to connect to regional/aggregation networks.

Another aspect of the present disclosure is relates to network failure protection and resiliency. The Ethernet Ring Protection and the Link Aggregation Control Protocol implemented in the local loops of the network can provide sub-50 ms protection switching when the fault detection is configured to use 10 ms continuity check messages (CCM). However, without an Ethernet operations administration and maintenance CCM implementation, the network of the present disclosure can still achieve sub-50 ms for both protocols when the failure is detected via loss of light. Therefore, in order to achieve fast protection mechanism in this case, all links can be configured in one or more embodiments as a 10 Gigabit Ethernet Wide Area Network Physical Layer (10GE WAN PHY), which will provide fault propagation as part of the synchronous digital hierarchy (SDH) line protocol. This will cause shut-down of Ethernet ports and will force Ethernet Ring Protection and Link Aggregation Control convergence within sub-50 ms. Thus, all links are protected at L2. Alternatively, Ethernet links can be protected using L1 protection if 10GE WAN PHY links are not used to connect the Ethernet switches. This leads to fast recovery when compared with conventional shortest path bridging (IEEE 802.1aq) because the system and method does not require recalculation of the shortest path trees. The term "L1" refers to the physical layer of the network which includes the basic hardware transmission technologies of the network and the term "L2" refers to the Data Link or Ethernet Layer of the network which transfers data between adjacent network nodes.

For nodal failure, the protection mechanism provided by ERP or MSTP in the local loops re-routes traffic around the failed node. Thus, in one or more embodiments, the source-based shortest path trees will not be re-calculated to keep recovery time very minimal.

Figure 4:
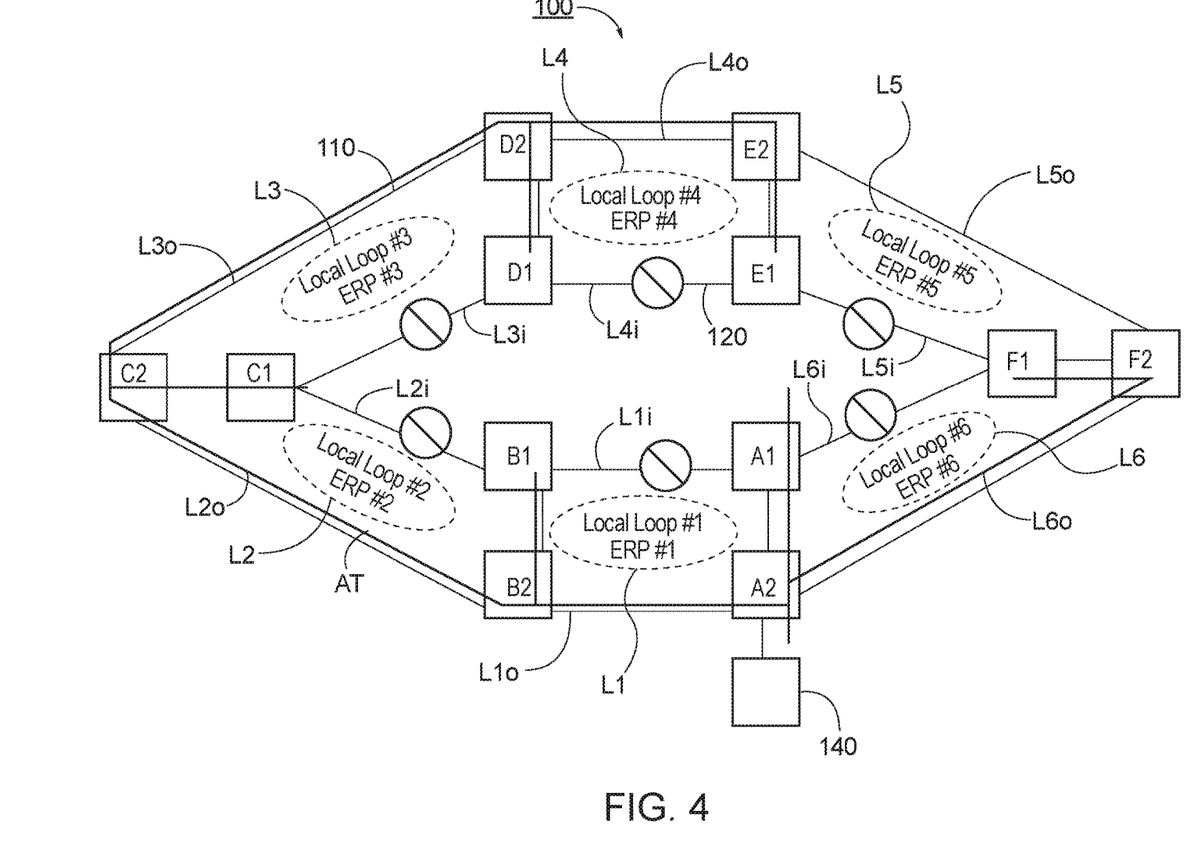
FIG. 4 diagrammatically depicts a shortest path tree for nodes A1 and A2 of the network of FIG. 1, which has been calculated according to the method of the present disclosure.

The trade-off for the fast switching and simplicity is the loss of a more optimum solution. The system and method of the present disclosure trades the optimal solution for simplicity. As shown in FIG. 4, the source-based shortest path tree for nodes A1 and A2 in local loop 1 has been calculated for a specific B-VID trunk. The collapsing step of the method simplifies the configuration of the ACLs at the ports of nodes E2 and F2 to blocked link L5o and the ports of nodes E1 and F1 to blocked link L5i, and allows a safe approximation of the source-base shortest path trees. The ERP in the local loops 1-6 of the network provides local blocking in the local ring, i.e., blocks the links forming the inner ring segments, which allows deterministic as well as optimal routing within the local loops.

Still referring to FIG. 4, in one such example of a loop free topology in a core network, when node A1 receives data destined for node C2 (e.g., from a connected aggregation/regional network or from a customer directly), the network 100 can collectively use the Ethernet Ring Protection (ERP) in the local loops and the B-MAC ACL filtering in the global loop to route the data to node C2 along the shortest path tree calculated for nodes A1 and A2. It should also be appreciated that any other suitable protocol can be used in place of ERP to break the local loop.

When node A1 receives data destined for node C2 for the first time, node A1 broadcasts the data to nodes B1, F1, and A2. Based on the ERP configuration for local loop 1 and local loop 6 for the specific B-VID where the data is being transmitted, node A1 is prevented from transmitting the data to nodes B1 and F1, but is allowed to transmit data to node A2. Thus, the ERP configuration causes node A1 to transmit the data destined for node C2 to node A2.

When node A2 receives data from node A1, node A2 broadcasts the data to nodes B2 and F2. Node A2 is not configured with an ACL to block traffic with a source B-MAC of node A1 and the ERP configurations for local loop 1 and local loop 6 allow node A2 to transmit data to nodes B2 and F2, thus node A2 successfully transmits the data to nodes B2 and F2.

When node B2 receives the data from node A2, node B2 will broadcast the data to node B1 and node C2. Node B2 is not configured on the port connecting to node B1 with an ACL to block traffic with a source B-MAC of node A1 and the ERP configurations for local loop 1 and local loop 2 allows node B2 to transmit data to node B1, thus node B2 successfully transmits the data to node B1. Similarly, node B2 is not configured on the port connecting to C2 with an ACL to block traffic with a source B-MAC of node A1 and the ERP configuration for local loop 2 allows node B2 to transmit data to node C2, thus node B2 successfully transmits the data to node C2, which will identify that the traffic is destined to it hence a successful transmission to from node A1 to node C2 is established (via the MAC learning process). Therefore, nodes A1, A2, and B2 will remember or learn the correct ports where they need to transmit the data to reach node C2.

Nevertheless, in order to further illustrate how the Ethernet Ring Protection in the local loops and the source B-MAC ACL filtering in the global loop create a loop-free topology, the following description traces the data transmission from A1 to the other nodes in the network capable of receiving data from node A1 that is destined to node C2.

Returning to node B1, when node B1 receives data from node B2, node B1 will not broadcast data to either node A1 or node C1. Based on the ERP configuration for local loop 1 and local loop 2 for the specific B-VID where the data is being transmitted, node B1 is prevented from transmitting the data to nodes A1 and C1.

Returning to node F2, when node F2 receives data from node A2, node F2 attempts to transmit the data to node F1 and node E2. Node F2 is not configured on the port connecting to node F1 with an ACL to block traffic with a source B-MAC of node A1 and an ERP configuration allows node F2 to transmit data to node F1, thus node F2 successfully transmits the data to node F1. However, an ACL in node F2 is configured on the ports connecting to E2 (link L5o) to prevent node F2 from transmitting data with a source B-MAC of node A1 (based on examining the B-MAC address associated with node A1), thus node F2 does not transmit the data to node E2.

When node F1 receives data from node F2, node F1 will not broadcast the data to either node A1 or E1. Based on the ERP configuration for local loop 5 and local loop 6 for the specific B-VID where the data is being transmitted, node F1 is prevented from transmitting the data to nodes A1 and E1. Moreover, an ACL in node F1 is configured on the ports connecting to E1 (link L5i) to prevent node F1 from transmitting data with a source B-MAC of node A1 (based on examining the B-MAC address associated with node A1), thus node F1 does not transmit the data to node E1.

It should therefore be appreciated that the Ethernet Ring Protection in the local loops and the source B-MAC ACL filtering in the global loop can work in concert to create a loop-free topology, which prevents node C2 from receiving the same data from more than one node in the network while achieving shortest path routing between node A1 and node C2.

The above example illustrates an initial instance where node A1 attempts to transmit data to node C2 (an initial learning process). Thereafter, as long as changes do not occur in the network topology for the core network, when node A1 receives data destined for node C2, node A1. A2, and B2 will transmit the data along the proper path to node C2.

It should also be appreciated that in one embodiment, the above described process happens until all routes/paths from any source node to any destination node are learned.

It should further be appreciated that the ERP configurations for the local loops are dynamic. That is, if the link L1o between node A2 and B2 becomes unavailable (from the above example), the ERP for local loop 1 can be dynamically reconfigured to allow traffic from node A1 to pass to node B1. As another example, if node B2 becomes unavailable, both ERP for local loop 1 and local loop 6 will be dynamically reconfigured to allow traffic from node A1 to pass to node B1 and then from node B1 to pass to node C1 and eventually to node C2 via link connecting C1 to C2.

Figure 5A:
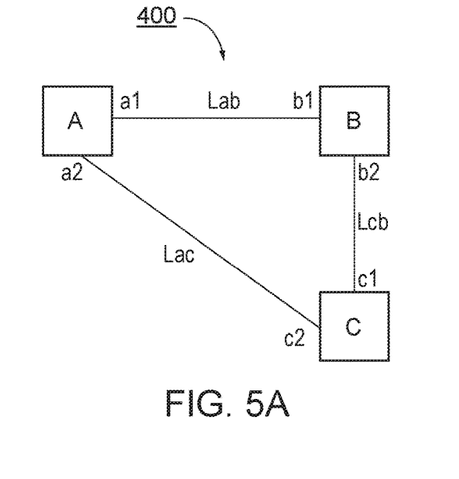
FIGS. 5A-5D diagrammatically depict the structure and operation of another exemplary network according the present disclosure.
Figure 5B:
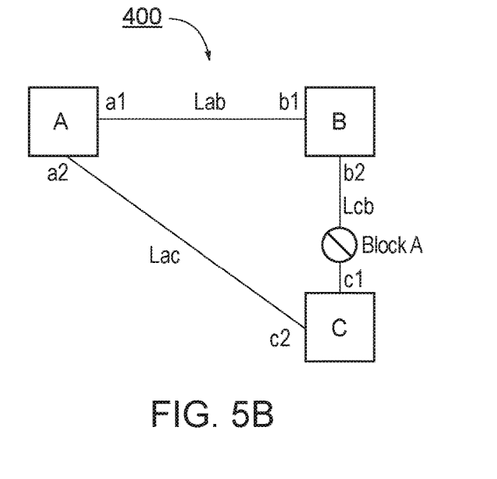
Figure 5C:
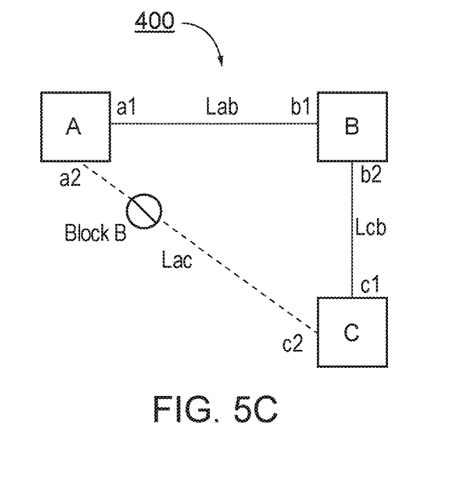
Figure 5D:
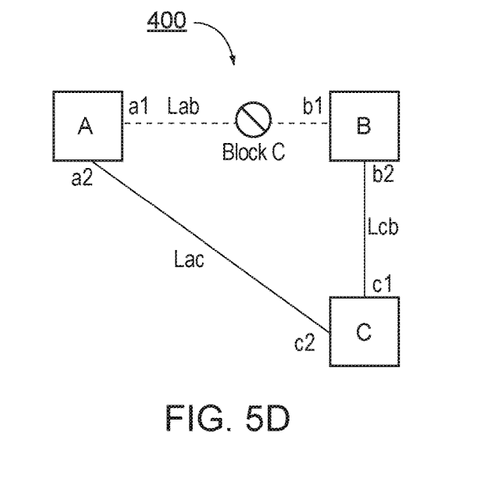

FIG. 5A depicts another exemplary network 400 comprising a single ring having three nodes A, B, and C. This embodiment further demonstrates how the principles of the present disclosure achieve a loop free network topology using the B-MAC ACL filtering while ensuring the shortest paths among all the nodes of the network As shown in the FIG. 5B, the A node-based shortest path tree AT does not include link Lcb connecting nodes C and B. Accordingly, ACLs configured at the ingress/egress ports of link Lcb will have an entry to block or deny traffic with a source B-MAC "A," or with a source B-MAC with a first group of hexadecimal digits that represent the regional network of "A." Similarly in FIG. 5C, the B node-based shortest path tree BT does not include the link Lac connecting nodes A and C, therefore, ACLs configured at the ingress/egress ports of link Lac will have an entry to block or deny traffic with a source B-MAC "B," or with a source B-MAC with a first group of hexadecimal digits that represent the regional network of node"B." As shown in FIG. 5D, the C node-based shortest path tree CT does not include the link Lab. Accordingly, an ACL configured at the ingress/egress ports of link Lab will have an entry to block or deny traffic with a source B-MAC "C," or with a source B-MAC with a first group of hexadecimal digits that represent the region of node "C." All ACLs will be configured at the time of the network implementation which will enforce the shortest path routing among all nodes. Therefore, node A will communicate with nodes B and C using the shortest path tree AT which will guarantee the shortest paths between nodes A and B as well as nodes A and C. The same applies to nodes B and C. For example, when node A receives customer traffic destined to node C, node A encapsulates the customer traffic with a PBB header and adds its B-MAC address. If node A doesn't know how to send the traffic to node C, it broadcasts the traffic to node B via port a1 and node C via port a2. Node C, which is the destination of the traffic coming from node A, responds back via c2. At the same time, since the traffic is not destined to node B, node B forwards the traffic to node C via b2, however, the ACL installed on port b2 denies all traffic with source B-MAC A and therefore, the loop in the network is being prevented and MAC learning between nodes A and C has been established via port a2 on node A and c2 on node C. While the ACL blocks the Lcb for traffic with source B-MAC A, the ACL allows traffic with source B-MACs B and C, thus guaranteeing that nodes B and C will communicate with each other via the shortest path. For example, nodes C and B use their shortest path trees CT and BT respectively to send traffic in the networks. Once B-MAC learning is established in the networks, data forwarding will occur using the shortest path trees which will guarantee shortest paths among all nodes in the network and therefore, node A for example, doesn't send any more traffic that is destined to node C via a1 facing node B.

Additionally, while the Dijkstra or any other algorithms are modified for source based blocking with respect to the global network, the same such algorithms may be used in the conventional form within the subnetwork, so that the full end to end routing comprises the source based blocking combined with the conventional use of the same or a different shortest path algorithm.

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A method for routing data in a network, the network including a plurality of nodes, the nodes connected by links, the plurality of nodes comprising at least three nodes including a first node and a second node that are sources of data transmitted in the network, the method comprising:

for each of the nodes in the network, determining, by a computing device, a shortest path tree to each of the other nodes in the network; and for data sourced from the first node, blocking the link or links not included in the shortest path tree determined for the first node without blocking any of the nodes of the network, while allowing data sourced from the second node to travel in the network according to the shortest path tree determined for the second node;

wherein the shortest path tree determined for the second node includes a link in the link or links not included in the shortest path tree determined for the first node;

wherein the nodes of the network are arranged in first and second rings; and wherein the first and second rings of the nodes are collapsed together prior to determining the shortest path tree.

2. The method of claim 1, further comprising, for the data sourced from the second node, blocking the link or links not included in the shortest path tree determined for the second node, while allowing the data sourced from the second node to travel in the network according to the shortest path tree determined for the second node.

3. The method of claim 1, wherein the blocking of the link or links comprises configuring an Access Control List.

4. The method of claim 3, wherein the configuring of the Access Control List is performed at each of the link or links not included in the shortest path tree determined for a node in the network.

5. The method of claim 1, wherein at least one of the nodes of the network comprises a subnetwork and wherein the determining of the shortest path tree comprises determining a shortest path tree between the subnetwork and each of the other nodes in the network.

6. The method of claim 1, wherein certain ones of the nodes in the first and second rings form at least one subnetwork.

7. The method of claim 6, wherein each of the nodes in the at least one subnetwork is connected to another of the nodes in the at least one subnetwork by two of the links.

8. The method of claim 7, wherein if one of the two links in a determined one of the shortest path trees fails, further comprising transmitting data on other one of the two links in accordance with the determined one of the shortest path trees.

9. The method of claim 7, wherein if one of the nodes of the at least one subnetwork fails, and the failed node is in a determined one of the shortest path trees, further comprising:
  i) with a processor, re-routing data within the at least one subnetwork to avoid the failed node; and
  ii) refraining, by the computing device, from recalculating the determined one of the shortest path trees as a result of the failed node having failed.

10. The method of claim 1, wherein the determining of the shortest path tree is performed with at least one of a Dijkstra algorithm, a breadth-first search algorithm, and a Bellman-Ford algorithm.

11. A system for routing data through a network comprising a plurality of nodes connected by links, the plurality of nodes comprising at least three nodes including a first node and a second node that are sources of data transmitted in the network, the system comprising:
  a first computing device for determining, for each of the nodes in the network, a shortest path tree to each of the other nodes in the network; and
  a second computing device for blocking, for data sourced from the first node, the link or links not included in the shortest path tree determined for the first node without blocking any of the nodes of the network, while allowing the data sourced from the second node to travel in the network according to the shortest path tree determined for the second node;
  wherein the shortest path tree determined for the second node includes a link in the link or links not included in the shortest path tree determined for the first node;
  wherein the nodes of the network are arranged in first and second rings; and
  wherein the first and second rings of the nodes are collapsed together prior to determining the shortest path tree.

12. The system of claim 11, wherein at least one of the nodes the network comprises a subnetwork and wherein the determining of the shortest path tree comprises determining a shortest path tree between the subnetwork and each of the other nodes in the network.

13. The system of claim 11, wherein the first and second rings are connected by certain ones of the links.

14. The system of claim 11, wherein certain ones of the nodes in the first and second rings form at least one subnetwork.

15. The system of claim 14, wherein each of the nodes in the at least one subnetwork is connected to another of the nodes in the at least one subnetwork by two of the links.

16. The system of claim 11, wherein the second computing device is also for configuring an Access Control List at ports of the link or links not included in the shortest path tree determined for a node in the network.

17. The system of claim 11, wherein at least one of the nodes of the network comprises a subnetwork and wherein the first computing device is also for determining a shortest path tree between the subnetwork and each of the other nodes in the network.

18. A method for routing data through a network, the network including a plurality of nodes, the nodes connected by links, the plurality of nodes comprising at least three nodes including a first node and a second node that are sources of data transmitted in the network, the method comprising:
  for each of the nodes in the network, determining, by a computing device, a shortest path tree to each of the other nodes in the network;
  for data sourced from the first node, blocking the link or links not included in the shortest path tree determined for the first node without blocking any of the nodes of the network, while allowing data sourced from the second node to travel in the network according to the shortest path tree determined for the second node; and
  for the data sourced from the second node, blocking the link or links not included in the shortest path tree determined for the second node, while allowing the data sourced from the second node to travel in the network according to the shortest path tree determined for the second node;
  wherein the shortest path tree determined for the first node includes a link in the link or links not included in the shortest path tree determined for the second node;
  wherein the nodes of the network are arranged in first and second rings; and
  wherein the first and second rings of the nodes are collapsed together prior to determining the shortest path tree.

* * * * *

UNITED STATES PATENT AND TRADEMARK OFFICE
CERTIFICATE OF CORRECTION

PATENT NO. : 9,960,992 B2  
APPLICATION NO. : 13/223939  
DATED : May 1, 2018  
INVENTOR(S) : Ahmad Najib Khalil et al.

Page 1 of 1

It is certified that error appears in the above-identified patent and that said Letters Patent is hereby corrected as shown below:

On the Title Page

Item (75) Inventors should read: Anthony W. Beseau

Signed and Sealed this  
Thirtieth Day of April, 2019

Andrei Iancu  
*Director of the United States Patent and Trademark Office*